Patented Feb. 27, 1923.

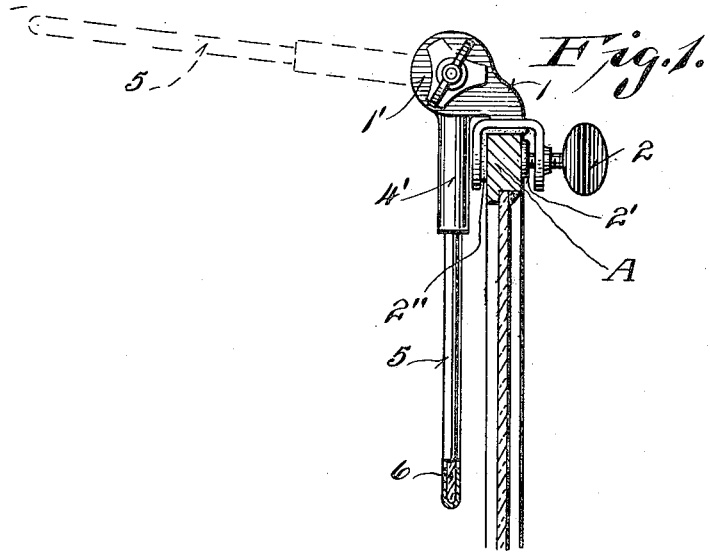
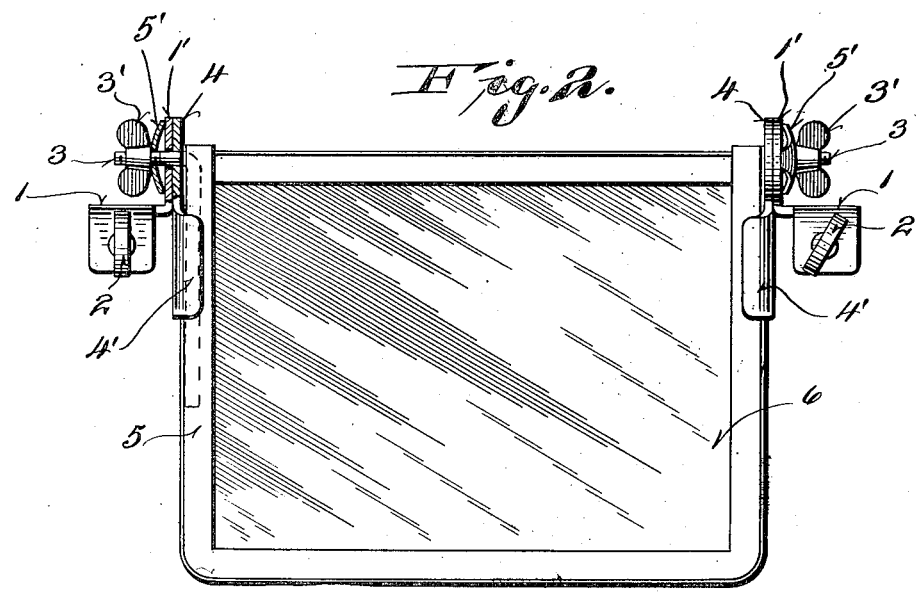

1,446,936

UNITED STATES PATENT OFFICE.

HENRY W. SELLMANN AND EDWARD J. GOTTSACKER, OF MILWAUKEE, WISCONSIN.

EYE PROTECTOR FOR MOTOR VEHICLES.

Application filed July 11, 1921. Serial No. 483,802.

*To all whom it may concern:*

Be it known that we, HENRY W. SELLMANN and EDWARD J. GOTTSACKER, both citizens of the United States, and residents of Milwaukee, in the county of Milwaukee and State of Wisconsin, have invented certain new and useful Improvements in Eye Protectors for Motor Vehicles; and we do hereby declare that the following is a full, clear, and exact description thereof.

Our invention has for its object to provide a simple, economical and effective shield attachment to vehicles for protecting the eyes of the driver or other occupants against glaring rays of light, whereby the user is not momentarily blinded by sun rays or the direct rays from high powered lamps of on-coming vehicles.

Another object of our invention is to provide a shield of the above character which is hingedly attached to the upper edge of any standard windshield and which can thereafter, be folded down upon the windshield glass within the field of vision and upon the glass shield, and when not in use, said shield can be swung upwardly so as to clear the sight through the standard glass. Thus the shield when folded down will render a patch of the glass windshield opaque, it being understood that transparent celluloid of any desired color can be used or, in some instances, glass can be employed as a substitute for the transparent opaque celluloid shield.

With the above and other objects in view, the invention consists in certain structural features and combination of parts as are hereinafter set forth with reference to the accompanying illustrations and subsequently claimed.

In the drawings,

Figure 1 represents an end elevation of a shield embodying the features of our invention, the same being shown attached to the upper edge of a windshield of standard type, which windshield is illustrated in section, and Figure 2, a face view of the same with parts broken away and in section to more clearly illustrate details of construction.

Referring by characters to the drawings, A represents the upper edge of a standard windshield which is adapted to receive companion clips 1. The clips are formed with spanner legs that are fitted over the upper edge of the windshield A. One of the legs, in each instance, is provided with a screw aperture for the reception of a clamping thumb screw 2, which thumb screw is formed with an end pad 2', that is adapted to impinge against the juxtaposed face of the shield frame, to thus prevent marring the same. The base and throat of the other clip leg may be, as shown, lined with suitable soft material 2'' to thus prevent marring of the parts when the attachment is fitted to the windshield.

Obviously in some instances, wherein the windshields are not encased in a frame, the clip can be attached directly to the glass surface, it being understood that the legs of the clip which span the frame A can be varied as to shape to meet the conditions of various forms of lwindshield frames. The clips 1—1 terminate with offset circular pad portions 1', which pad portions are centrally apertured for the reception of threaded trunnions 3. The trunnions 3, as indicated in Figure 2 of the drawings, in this instance, extend through circular disks 4 that constitute part of a rectangular skeleton frame 5. In order to strengthen the frame which is U shaped in cross section, we preferably fold the trunnion 3 at a right angle and extend their inner ends downwardly and into the U shape frame members, whereby they form strengthening elements.

In this exemplification of our invention, we have also shown the disks 4 in the form of brackets, having downwardly extending feet 4' which are soldered or otherwise secured to the U shaped frame members 5, whereby the frame corners at the trunnion end of the shield is further reinforced.

Obviously we may, without departing from the spirit of our invention, in some instances, form the frame elements 5 with integral disks 4, it being understood that said disks in connection with the pads 1' of the clips 1, form companion friction disk elements which are held firmly in contact, whereby the shield, when swung to a predetermined elevation, will be held in suspension by said frictional contact. In order to regulate the slippage or friction contact between the disk element and the pad element 4, we employ a spring star washer 5, one of which is suitably mounted upon each trunnion 3 and pressure is exerted upon the washers by thumb nuts 3', which thumb nuts are in threaded union with the trunnions 3. The rectangular frame 5 serves as a mounting for a transparent sheet 6, which sheet is preferably composed of celluloid or isinglass, the same being colored to suit the taste of the user and to effectually protect the eyes against sharp light rays.

In practice, the transparent sheet is usually of a blue, smoked or amber tone. Obviously, the sheet may, in some instances, in more expensive structures, be manufactured from a glass plate.

While we have shown and described the eye protecting shield as particularly adapted to fold over a glass shield, and thereby render a field of it opaque, obviously the device can be attached to a bar or other suitable support at the front of the driver of a motor vehicle of the pleasure type or a tractor, it being particularly desirable for use in connection with driving tractors, whereby the driver is not only protected against the sharp rays of the sun, but the structure, in this instance, also serves as a protection against dust, or the like.

It is also manifest that the frame 5 can be made of any suitable material and form to properly protect and encase the sheet 6, it being also possible, where glass is used, to dispense with the skeleton frame, in which instance, the disks 4 which carry the trunnions would be directly fastened to the corners of the glass sheet by clamps of the same type, as those described in connection with clips 1.

We claim:

An eye-protecting shield for vehicles comprising a skeleton frame U-shaped in cross section, lugs extending from corners of the frame, feet on said lugs U-shaped in cross section secured to and reinforcing said frame, threaded trunnions extending through said ears, said trunnions being bent laterally and received in said frame for reinforcing said frame, clips having apertured portions mounted on the trunnions, thumb nuts mounted on the trunnions, means rigid with the clips for engagement with the upper edge of the wind shield, and an opaque sheet mounted in the frame adapted to be swung downwardly over a field of the wind shield to dim the rays of light therethrough and to be swung upwardly clear of the wind shield when not in use.

In testimony that we claim the foregoing we have hereunto set our hands at Milwaukee, in the county of Milwaukee and State of Wisconsin.

HENRY W. SELLMANN.
EDWARD J. GOTTSACKER.